US011884515B2

(12) United States Patent

Wang et al.

(10) Patent No.: US 11,884,515 B2

(45) Date of Patent: Jan. 30, 2024

(54) CLAMPING DEVICE AND ELEVATOR SYSTEM

(71) Applicant: Otis Elevator Company, Farmington, CT (US)

(72) Inventors: Qirui Wang, Shanghai (CN); Zhenyan Tong, Shanghai (CN); Ruili Zhang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 106 days.

(21) Appl. No.: 17/528,384

(22) Filed: Nov. 17, 2021

(65) Prior Publication Data

US 2022/0324677 A1 Oct. 13, 2022

(30) Foreign Application Priority Data

Apr. 13, 2021 (CN) ........................ 202110394018.4

(51) Int. Cl.

*B66B 7/06* (2006.01)

*B66B 5/12* (2006.01)

(52) U.S. Cl.

CPC ..................................... *B66B 7/06* (2013.01)

(58) Field of Classification Search

CPC .. B66B 7/10; B66B 7/085; B66B 7/08; B66B 5/12

See application file for complete search history.

(56) References Cited

U.S. PATENT DOCUMENTS

| | | | | |
|---|---|---|---|---|
| 2,017,372 A * | 10/1935 | Morrison | B66B 7/06 | 187/413 |
| 3,686,810 A * | 8/1972 | Allen | E04B 2/78 | 52/489.1 |
| 5,644,878 A * | 7/1997 | Wehrmann | E04B 2/7863 | 52/287.1 |
| 6,234,277 B1 | 5/2001 | Kaczmarek | | |
| 6,430,885 B1 * | 8/2002 | Ito | E04F 13/0816 | 52/282.1 |

(Continued)

FOREIGN PATENT DOCUMENTS

| | | |
|---|---|---|
| JP | H1036038 A | 2/1998 |
| JP | 2014125305 A | 7/2014 |
| WO | 2008079145 A1 | 7/2008 |

OTHER PUBLICATIONS

European Search Report for Application No. 21209714.1, dated May 16, 2022, 8 Pages.

(Continued)

*Primary Examiner* — Diem M Tran

(74) *Attorney, Agent, or Firm* — CANTOR COLBURN LLP

(57) ABSTRACT

A clamping device and an elevator system. The clamping device includes: a base having a limiting space and an opening communicating with the limiting space; and a clamping arm assembly, which is arranged at the opening of the base and forms a gap with the opening in a stationary state, the gap being smaller than a size of a clamped part; in which the clamp arm assembly has a first damping force that allows the clamped part to enter the limiting space via the opening, and has a second damping force that allows the clamped part to exit the limiting space via the opening; and the second damping force is greater than the first damping force.

13 Claims, 5 Drawing Sheets

(56) References Cited

U.S. PATENT DOCUMENTS

| | | | | |
|---|---|---|---|---|
| 9,051,741 | B2 * | 6/2015 | Bilge | E04F 13/0891 |
| 9,670,669 | B2 * | 6/2017 | Gosling | E04C 2/288 |
| 11,365,094 | B2 * | 6/2022 | Rocher | B66B 7/06 |

OTHER PUBLICATIONS

Unknown, "SNAPTRACK Product Bulletin SNAPTRACK—Mounting Track System", Scidyne Corporation, Sep. 1, 2018, pp. 1-2, URL:https://www.scidyne.com/ftp/brochure/snaptrack.pdf.

* cited by examiner

CLAMPING DEVICE AND ELEVATOR SYSTEM

FOREIGN PRIORITY

This application claims priority to Chinese Patent Application No. 202110394018.4, filed Apr. 13, 2021, and all the benefits accruing therefrom under 35 U.S.C. § 119, the contents of which in its entirety are herein incorporated by reference.

TECHNICAL FIELD

The present application relates to the field of elevators. More specifically, the present application relates to a clamping device for preventing excessive swinging of a traveling cable of an elevator system.

BACKGROUND

As a tool for improving the walking of passengers between floors or shortening the walking distance of passengers, passenger transportation devices are very common in daily life. As an example, the most common passenger transportation devices are escalators and elevators that are usually used between floors of commercial buildings, and moving walkways that are usually used in large airports.

An elevator system usually includes one or more elevator cars that can move along an elevator hoistway. In order to provide electricity for components that implement lighting, audio, communication and other functions (such as connection between a car operation panel and a control system of the elevator system) in the elevator car, a traveling cable will be additionally provided in the elevator hoistway. One end of such traveling cable may be connected to an elevator control system, and the other end may be operatively connected to the elevator car.

In some application scenarios and hoistway structures or when affected by a variable-speed operation of the elevator car, the traveling cable often swings to a certain extent in the elevator hoistway. An example of the mentioned application scenarios may be a high-rise building, in which the traveling cable has a very large length and swings due to vibration conditions. Such an undesirable swinging process may interfere with brackets and/or other components in the elevator hoistway. In addition, due to the small distance between the traveling cable and the elevator hoistway, this kind of swinging will also cause excessive wear of the traveling cable and affect its service life. Sudden excessive wear may even affect power supply of the elevator car and cause safety hazards.

SUMMARY

The present application aims to provide a clamping device and an elevator system to solve or at least alleviate some of the aforementioned technical problems.

In order to achieve at least one object of the present application, according to an aspect of the present application, a clamping device is provided, which includes: a base having a limiting space and an opening communicating with the limiting space; and a clamping arm assembly, which is arranged at the opening of the base and forms a gap with the opening in a stationary state, the gap being smaller than a size of a clamped part; in which the clamp arm assembly has a first damping force that allows the clamped part to enter the limiting space via the opening, and has a second damping force that allows the clamped part to exit the limiting space via the opening; and the second damping force is greater than the first damping force.

In addition to or as an alternative to one or more of the above features, in another embodiment, the clamping arm assembly is hinged to the base, and the clamping arm assembly is capable of rotating toward the limiting space under a driving force no less than the first damping force, and are capable of rotating away from the limiting space under a driving force no less than the second damping force.

In addition to or as an alternative to one or more of the above features, in another embodiment, the clamping arm assembly includes: a first-stage force arm and a first-stage damping member, in which the first-stage damping member applies a damping force to the first-stage force arm when the first-stage force arm rotates either toward or away from the limiting space; and a second-stage force arm and a second-stage damping member, in which the second-stage force arm is associated with the first-stage force arm, and moves in association with the first-stage force arm when the first-stage force arm rotates away from the limiting space; and when the second-stage force arm moves in association, the second-stage damping member applies a damping force to the second-stage force arm; the damping force applied by the first-stage damping member is not greater than the first damping force, and a damping force applied by the first-stage damping member and the second-stage damping member in association is not greater than the second damping force.

In addition to or as an alternative to one or more of the above features, in another embodiment, the first-stage force arm includes a first section and a second section; a first end of the first section and a first end of the second section are connected to each other and form an included angle, a first hinge point of the first-stage force arm and the base is arranged at a connection position of the first section and the second section, and the first-stage damping member is arranged at the first hinge point and abuts between a portion of the base that is close to the opening and the first section.

In addition to or as an alternative to one or more of the above features, in another embodiment, a first end of the second-stage force arm abuts a side of the second section that is close to the first section and moves in association with the second section, and a second hinge point of the second-stage force arm and the base is arranged at a second end of the second-stage force arm; the second-stage damping member is arranged at the second hinge point and abuts between a portion of the base that is away from the opening and the second-stage force arm.

In addition to or as an alternative to one or more of the above features, in another embodiment, the first-stage damping member is configured as a first torsion spring arranged around the first hinge point, and the first section further includes a first stop wall for abutting the first torsion spring; and/or the second-stage damping member is configured as a second torsion spring arranged around the second hinge point, and the second-stage force arm further includes a second stop wall for abutting the second torsion spring.

In addition to or as an alternative to one or more of the above features, in another embodiment, two said clamping arm assemblies arranged oppositely are included; in which one of the clamping arm assemblies is hinged to the base at a first end of the opening, and the other one of the clamping arm assemblies is hinged to the base at a second end of the opening.

In addition to or as an alternative to one or more of the above features, in another embodiment, in a stationary state, the two clamping arm assemblies are aligned with each other.

In addition to or as an alternative to one or more of the above features, in another embodiment, the rotatable end of the clamping arm assembly has a guiding arc surface, and the guiding arc surface is configured to follow the direction in which the clamped part enters and exits the limiting space via the opening.

In addition to or as an alternative to one or more of the above features, in another embodiment, the base further includes a fixing portion that allows the base to be fixed to an installation position.

In addition to or as an alternative to one or more of the above features, in another embodiment, the clamping device is configured to clamp or release a traveling cable of an elevator system.

In order to achieve at least one object of the present application, according to another aspect of the present application, an elevator system is provided, which includes: an elevator car, which can move along an elevator hoistway; a traveling cable, which is operably connected to the elevator car and can move along the elevator hoistway together with the elevator car; and a plurality of the clamping devices as described above, which are respectively arranged in the elevator hoistway in a moving direction of the elevator car and are aligned with the traveling cable respectively; in a downward movement process of the elevator car, if a swinging force of the traveling cable is not less than the first damping force, the traveling cable swings to enter the limiting space via the opening of the clamping device; and in an upward movement process of the elevator car, if a resultant force of a traction force of the elevator car and the swinging force of the traveling cable is not less than the second damping force, the traveling cable is pulled by the elevator car to exit the limiting space via the opening of the clamping device.

In addition to or as an alternative to one or more of the above features, in another embodiment, the plurality of clamping devices are installed in the elevator hoistway at an interval of 6-8 meters.

In addition to or as an alternative to one or more of the above features, in another embodiment, an upper portion of the traveling cable is fixed in the elevator hoistway.

In addition to or as an alternative to one or more of the above features, in another embodiment, the traveling cable is configured to have a cross-section with a thickness smaller than a width; the traveling cable swings substantially in the thickness direction, and the clamping device is arranged to align with the traveling cable in the thickness direction.

According to the clamping device of the present application, by providing a clamping arm assembly that cooperates with the base, different damping forces that allow the clamped part (for example, the traveling cable, etc.) to enter and exit the limiting space of the base are provided, so that the clamped part can overcome a small first damping force and enter the limiting space, thereby restraining the clamped part in the limiting space and avoiding the collision and wear caused by excessive swinging; and the clamped part needs to overcome a larger second damping force to exit the limiting space. Therefore, the possibility of the clamped part being disengaged from the clamping device due to swinging is avoided, and only when an external force is required for deliberate traction, can the clamped part be disengaged from the clamping device. This arrangement has a low cost and can achieve reliable clamping of the clamped part. The elevator system to which this kind of clamping device is applied can thus reliably alleviate the undesired swinging of the traveling cable, increase its service life, and avoid the potential safety hazards caused thereby.

DETAILED DESCRIPTION OF THE EMBODIMENT(S)

Hereinafter, the present application will be described in detail with reference to exemplary embodiments in the accompanying drawings. However, it should be understood that the present application can be implemented in many different forms, and should not be construed as being limited to the embodiments set forth herein. These embodiments are provided herein to make the disclosure of the present application more complete and similar, and to fully convey the concept of the present application to those skilled in the art.

In addition, for any single technical feature described or implied in the embodiments mentioned herein, or any single technical feature shown or implied in individual drawings, the present application still allows these technical features (or equivalents thereof) to be further arbitrarily combined or deleted without any technical obstacle, thereby obtaining more other embodiments of the present application that may not have been directly mentioned herein.

Figure 1:
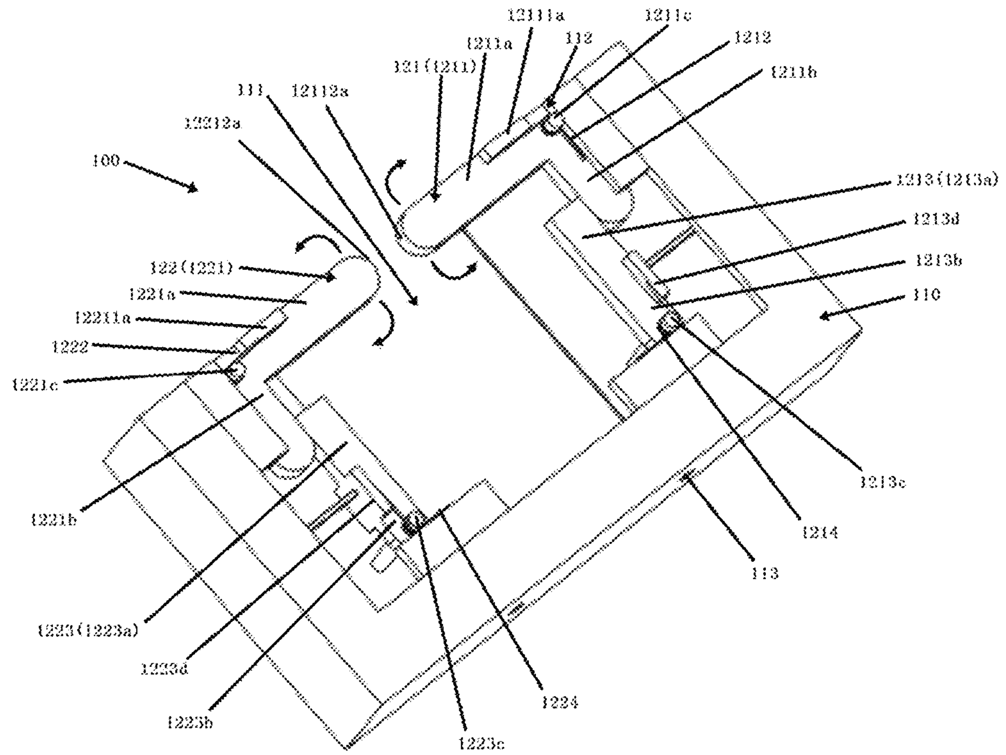
FIG. 1 is a schematic view of an embodiment of a clamping device from a first perspective, in which a clamped traveling cable is not shown.
Figure 2:
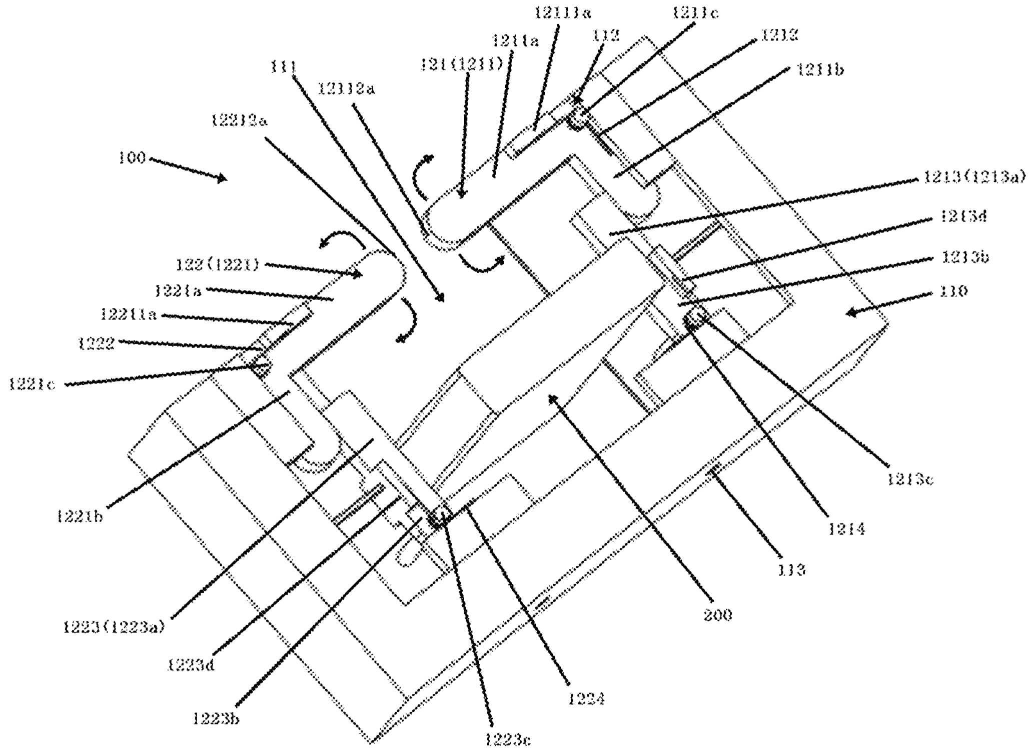
FIG. 2 is a schematic view of an embodiment of the clamping device from the first perspective, in which the clamped traveling cable is shown.
Figure 3:
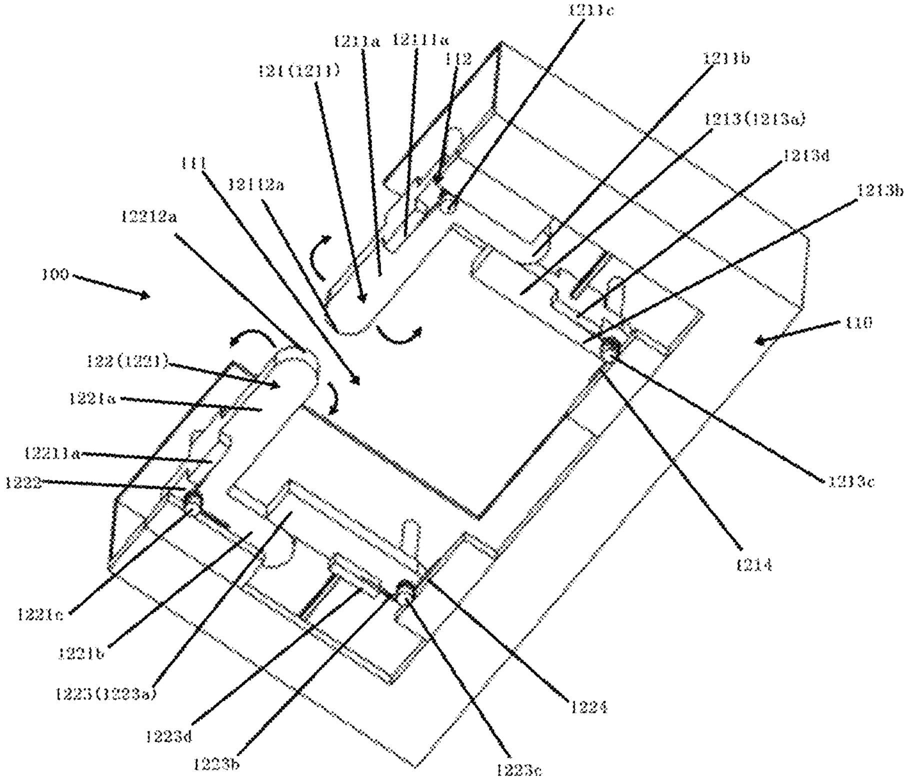
FIG. 3 is a schematic view of an embodiment of the clamping device from a second perspective, in which the clamped traveling cable is not shown.
Figure 4:
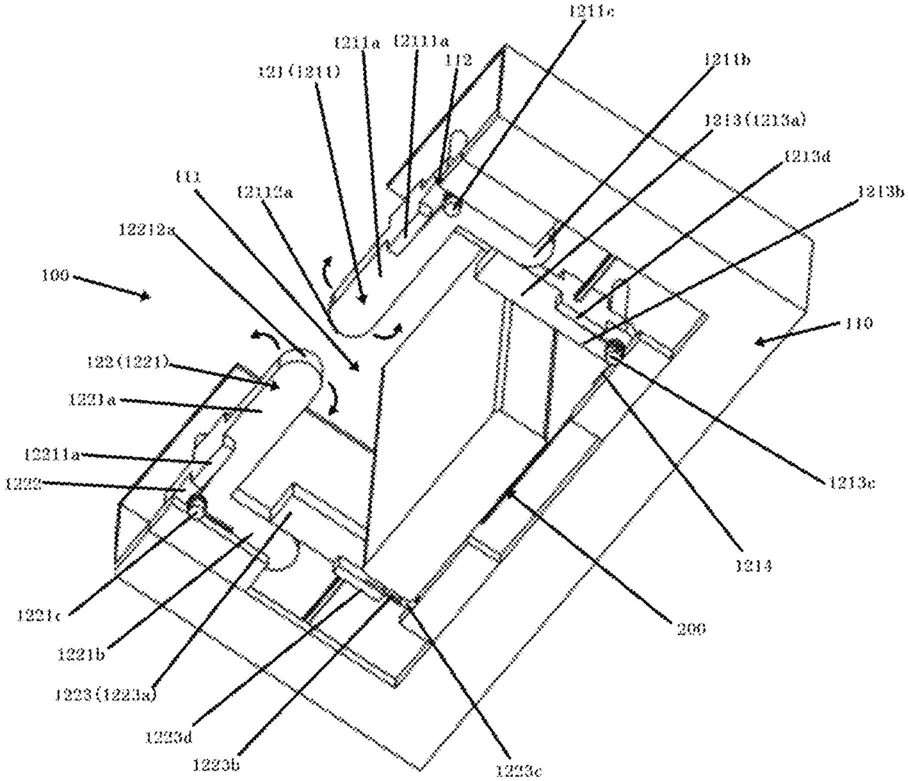
FIG. 4 is a schematic view of an embodiment of the clamping device from the second perspective, in which the clamped traveling cable is shown.
Figure 5:
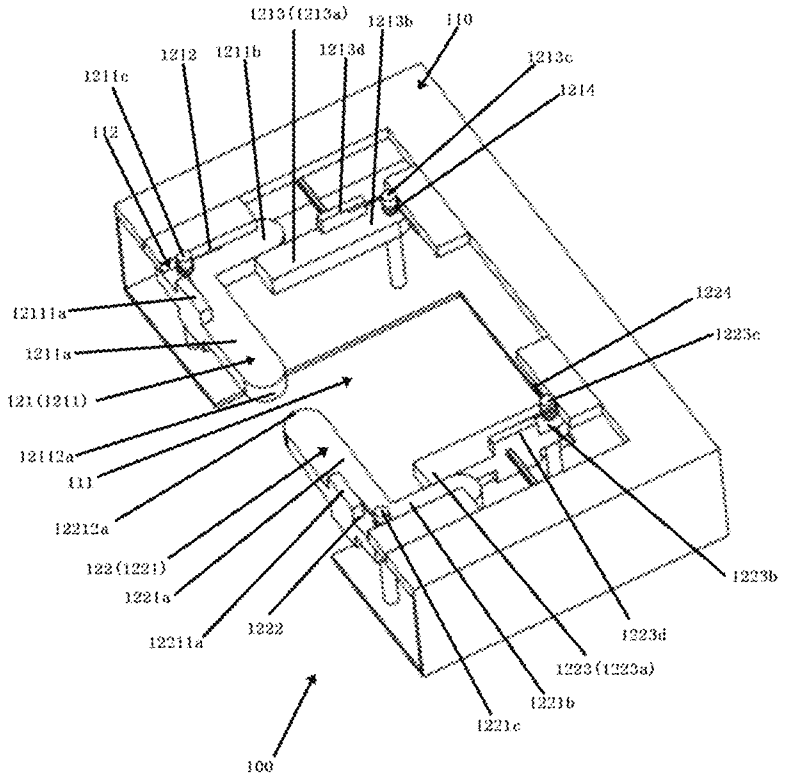
FIG. 5 is a schematic view of an embodiment of the clamping device from a third perspective, in which the clamped traveling cable is not shown.
Figure 6:
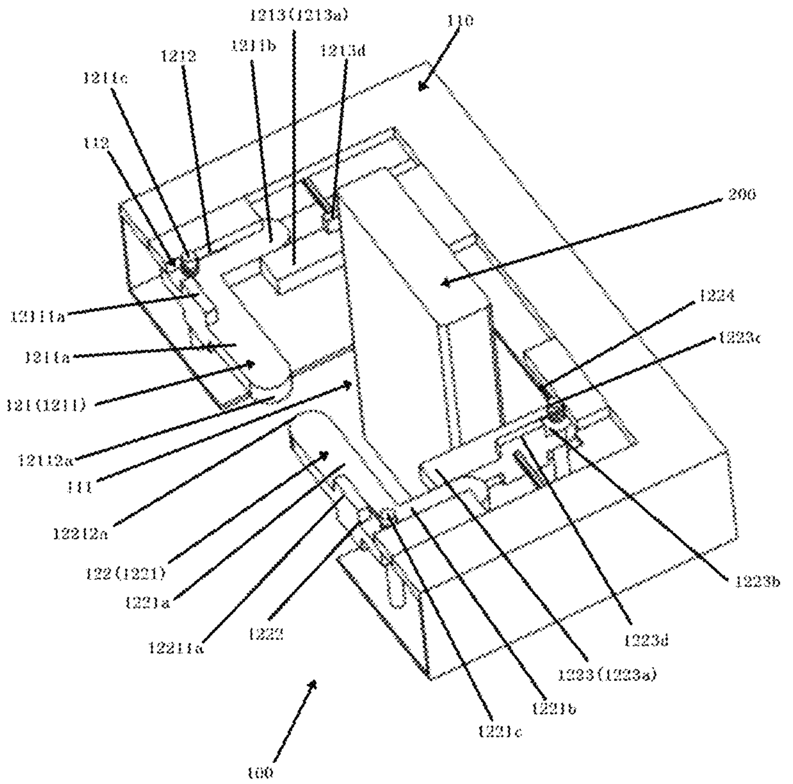
FIG. 6 is a schematic view of an embodiment of the clamping device from the third perspective, in which the clamped traveling cable is shown.
Figure 7:
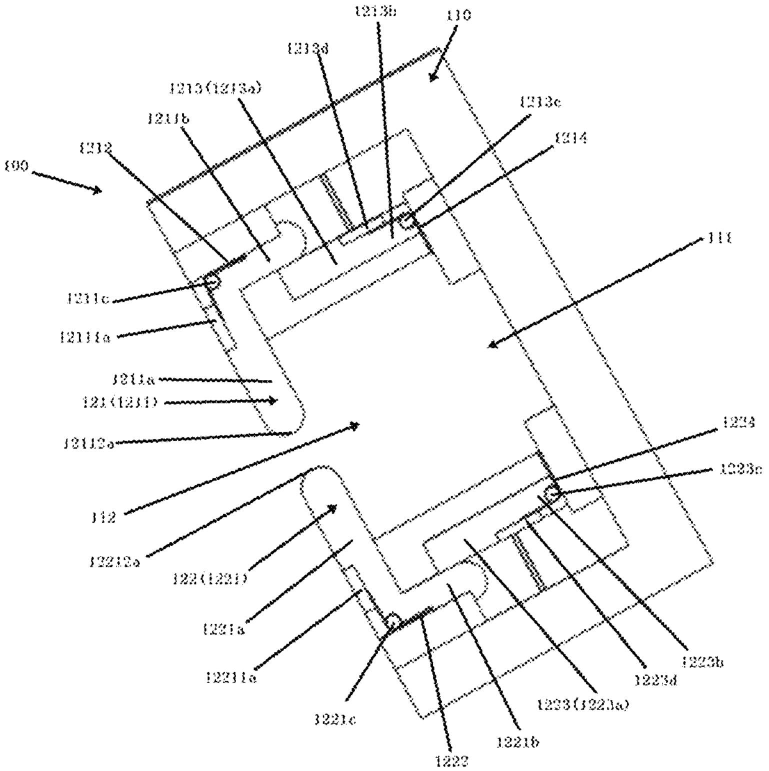
FIG. 7 is a schematic view of an embodiment of the clamping device from a fourth perspective, in which the clamped traveling cable is not shown.
Figure 8:
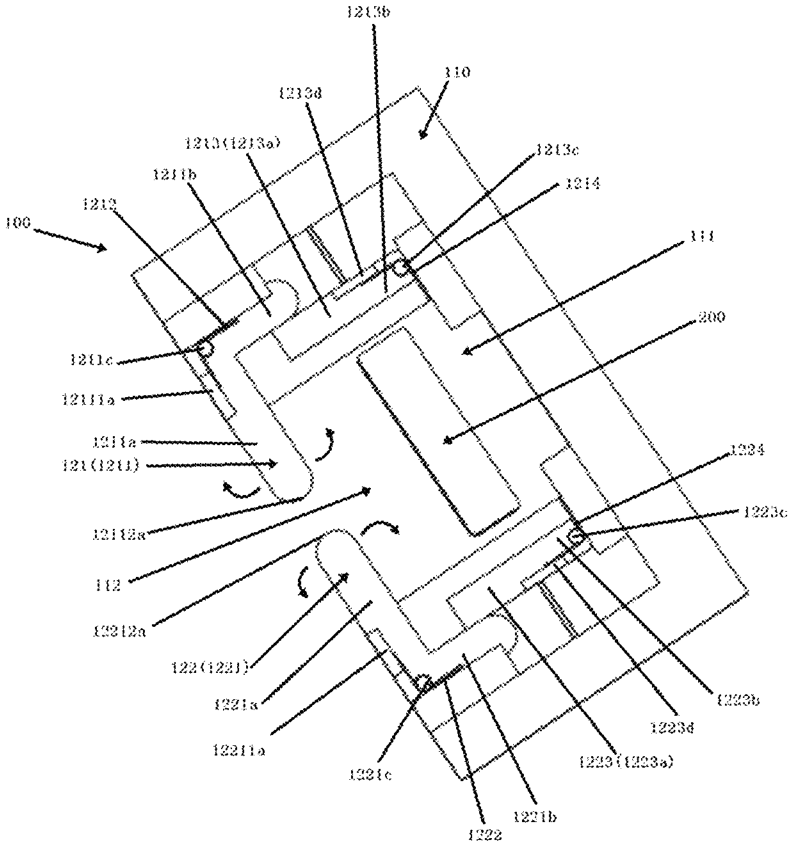
FIG. 8 is a schematic view of an embodiment of the clamping device from the fourth perspective, in which the clamped traveling cable is shown.
Figure 9:
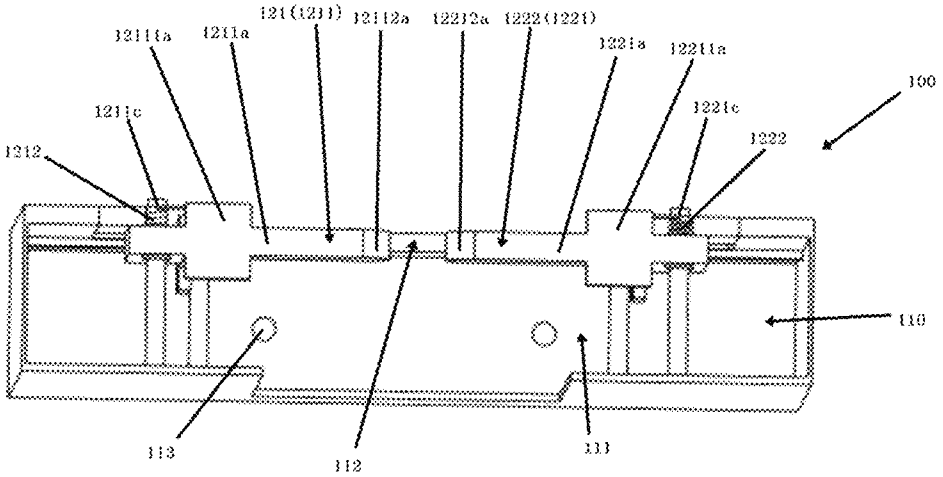
FIG. 9 is a schematic view of an embodiment of the clamping device from a fifth perspective, in which the clamped traveling cable is not shown.
Figure 10:
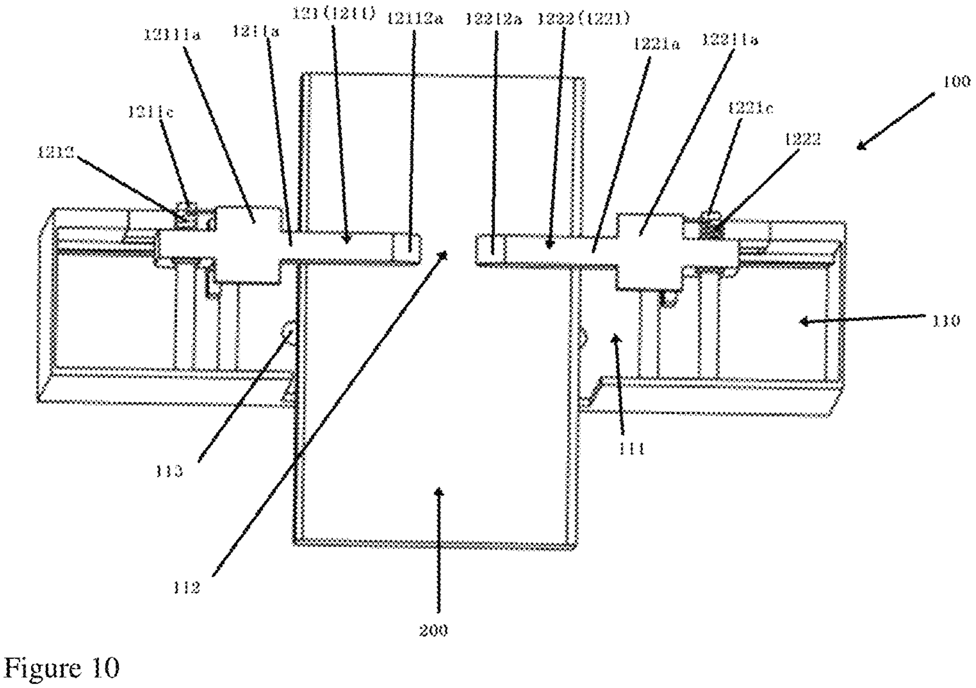
FIG. 10 is a schematic view of an embodiment of the clamping device from the fifth perspective, in which the clamped traveling cable is shown.

In the present application, a clamping device and its arrangement associated with an elevator system will be exemplarily described herein with reference to FIGS. 1-10. The clamping device 100 generally includes a base 110 and two clamping arm assemblies 121, 122. In each of the figures, a clamping action of the clamping device 100 is shown by limiting a traveling cable of the elevator system, which will be described below in conjunction with the accompanying drawings.

With continued reference to FIGS. 1 to 10, the base 110 is generally configured into the form of a frame made of sheet metal, thereby achieving a comprehensive consideration of both material and strength. The base 110 encloses a limiting space 111 with an opening 112, and the opening 112 communicates the limiting space 111 of the base 110 with an outer side of the base 110, i.e., a side that will typically face a clamped part in an installed position.

In the figure, two clamping arm assemblies 121, 122 arranged opposite to each other are shown, in which one clamping arm assembly 121 is hinged to the base 110 at a first end of the opening 112, and the other clamping arm assembly 122 is hinged to the base 110 at a second end of the opening 112. The two clamping arm assemblies are aligned with each other in a stationary state, and form a gap smaller than the size of the clamped part with the opening 112. This arrangement makes the clamped part unable to enter or exit the limiting space 111 from the opening 112 in the stationary state. More specifically, any one of the clamping arm assemblies 121, 122 is a component with damping that can initiate a movement after being driven, and has a first damping force that allows the clamped part to enter the limiting space 111 via the opening 112, and a second damping force that allows the clamped part to exit the limiting space 111 via the opening 112. The aforementioned second damping force is greater than the first damping force, which means that a greater driving force is required for forcing the clamped part to exit the limiting space 111 than forcing it to enter the limiting space 111.

In this arrangement, by providing the clamping arm assemblies 121, 122 that cooperate with the base 110, the clamping device 100 of this embodiment provides different damping forces that allow the clamped part (for example, a traveling cable 200, etc.) to enter and exit the limiting space 111 of the base 110. When the clamped part is actively or passively subjected to an applied external force, it can overcome the smaller first damping force and enter the limiting space 111, so that it is restrained in the limiting space 111, and collision and wear caused by excessive swinging are avoided; and when the clamped part is actively or passively subjected to a greater external force, it needs to overcome a greater second damping force to exit the limiting space 111. Continuing to take the traveling cable as an example, this arrangement avoids the possibility of the clamped part being disengaged from the clamping device 100 due to swinging, and only when an external force is required for deliberate traction, can the clamped part be disengaged from the clamping device 100. This arrangement has a low cost and can achieve reliable clamping of the clamped part.

In the following, the configurations of various parts of the clamping device and connection relationships thereof will be introduced. In addition, in consideration of further improvement of the reliability, practicability, economy or other aspects, some additional parts may be added, which are also exemplified as follows.

For example, continuing to refer to FIGS. 1 to 10, when the two clamping arm assemblies 121, 122 are both hinged to the base 110, they can rotate about the hinge points when they receive an external force that meets requirements. Specifically, the clamping arm assemblies 121, 122 can rotate toward the limiting space 111 under a driving force no less than the first damping force, and can rotate away from the limiting space 111 under a driving force no less than the second damping force. Of course, the figure only exemplarily gives an example of the connection mode between the clamping arm assemblies and the base, and other movable connection modes such as sliding may also be used under the premise of meeting the inventive object of this embodiment.

As another example, as a structural form for specifically realizing the clamping arm assemblies 121, 122, they each include a first-stage force arm 1211, 1221 and a second-stage force arm 1213, 1223 associated with the first-stage force arm 1211, 1221 for providing support, and each include a first-stage damping member 1212, 1222 and a second-stage damping member 1214, 1224 for providing damping.

Specifically, when the first-stage force arms 1211, 1221 rotate toward the limiting space 111, the first-stage damping members 1212, 1222 each apply a damping force to the first-stage force arms 1211, 1221; and when the first-stage force arms 1211, 1221 rotate away from the limiting space 111, the first-stage damping members 1212, 1222 actuate the second-stage force arms 1213, 1223 to move in association therewith. At this time, the first-stage damping members 1212, 1222 apply a damping force to the first-stage force arms 1211, 1221, and the second-stage damping members 1214, 1224 apply a damping force to the second-stage force arms 1213, 1223. In the design process, the damping force applied by the first-stage damping members 1212, 1222 should not be greater than the first damping force, and the damping force applied by the first-stage damping members 1212, 1222 and the second-stage damping members 1214, 1224 in association should not be greater than the second damping force. Under this arrangement, only when the external force applied to the clamped part exceeds the thresholds of these two damping forces respectively, can the corresponding restrained or restrained behavior occur.

The structural details of the two stages of damping members will be described in greater detail in conjunction with the drawings as follows.

Firstly, for the first-stage damping members, the corresponding first-stage force arms 1211, 1221 are configured into an "L"-shaped structure, and respectively include a first section 1211*a*, 1221*a* and a second section 1211*b*, 1221*b*. First ends 1213*a*, 1223*a* of the first sections 1211*a*, 1221*a* and first ends 1213*a*, 1223*a* of the second sections 1211*b*, 1221*b* are connected to each other and form an included angle; optionally, the included angle may for example be the right angle as shown in the figure.

In addition, first hinge points 1211*c*, 1221*c* of the first-stage force arms 1211, 1221 and the base 110 are arranged at the connection positions of the first sections 1211*a*, 1221*a* and the second sections 1211*b*, 1221*b*, and at the same time, the first-stage damping members 1212, 1222 are arranged at these positions so that the first-stage damping members 1212, 1222 abut between a portion of the base 110 that is close to the opening 112 and the first sections 1211*a*, 1221*a*. More specifically, the first-stage damping members 1212, 1222 may be configured as first torsion springs 1212, 1222 arranged around first hinge posts 1211*c*, 1221*c*, and first stop walls 12111*a*, 12211*a* for abutting the first torsion springs 1212, 1222 are arranged on the first sections 1211*a*, 1221*a*. At this time, when the first-stage force arms 1211, 1221 receive a force toward the limiting space 111 from the clamped part, they will press the first torsion springs 1212, 1222 toward the limiting space 111 through the first stop walls 12111*a*, 12211*a*. When the force is greater than the first damping force, the first torsion springs 1212, 1222 are forced to compress backward by a certain angle by the first stop walls. At this time, the first sections 1211*a*, 1221*a* of the first-stage force arms 1211, 1221 are rotated backward until a gap sufficient for the clamped part to pass through is exposed at the opening 112, thereby realizing the capture of the clamped part. When the clamped part enters the limiting space 111, the first-stage force arms 1211, 1221 are no longer subjected to the external force applied by the clamped part. At this time, the first torsion springs 1212, 1222 release the elastic energy, and push the first-stage force arms 1211, 1221 back to the initial positions through the first stop walls. In this process, the second-stage force arms 1213, 1223 are not actuated.

Next, for the second-stage damping members, the corresponding second-stage force arms 1213, 1223 are configured into a vertical strip structure, and first ends 1213*a*, 1223*a* thereof abut inner sides of the second sections 1211*b*, 1221*b*, and can move in association with the second sections 1211*b*, 1221*b* when the second sections 1211*b*, 1221*b* rotate toward the limiting space. Second hinge points 1213*c*, 1223*c* of the second-stage force arms 1213, 1223 and the base 110 are arranged at second ends 1213*b*, 1223*b* of the second-stage force arms 1213, 1223, thereby forming the fulcrum for the associated rotation.

In addition, the second-stage damping members 1214, 1224 are arranged at the second hinge points 1213*c*, 1223*c*, and abut between a portion of the base 110 that is away from the opening 112 and the second-stage force arms 1213, 1223. More specifically, the second-stage damping members 1214, 1224 may be configured as second torsion springs 1214, 1224 arranged around second hinge posts 1213*c*, 1223*c*, and second stop walls 1213*d*, 1223*d* for abutting the second torsion springs 1214, 1224 are arranged on the second-stage force arms 1213, 1223. At this time, when the first-stage force arms 1211, 1221 receive a force away from the limiting space 111 from the clamped part located in the limiting space 111, the first-stage force arms 1211, 1221 will drive the first sections 1211*a*, 1221*a* of the first-stage force arms 1211, 1221 to rotate away from the limiting space 111. Correspondingly, the second sections 1211*b*, 1221*b* of the first-stage force arms 1211, 1221 will rotate toward the limiting space 111, and the rotational movement path will be interfered by the second-stage force arms 1213, 1223, thereby making the second sections 1211*b*, 1221*b* still need to push the second-stage force arms 1213, 1223 to rotate. In this process, the external force from the clamped part needs to simultaneously overcome the damping forces of the first torsion springs 1212, 1222 and the second torsion springs. Specifically, when the force is greater than the second damping force, the first torsion springs 1212, 1222 and the second torsion springs 1214, 1224 are both compressed by a certain angle. At this time, the first sections 1211*a*, 1221*a* of the first-stage force arms 1211, 1221 will rotate outward until a gap sufficient for the clamped part to pass through is exposed at the opening 112, thereby realizing the release of the clamped part. After the clamped part exits the limiting space 111, the first-stage force arms 1211, 1221 and the second-stage force arms 1213, 1223 are no longer subjected to the external force applied by the clamped part. At this time, the first torsion springs 1212, 1222 and the second torsion springs 1214, 1224 both release the elastic energy, and push the first-stage force arms 1211, 1221 and the second-stage force arms 1213, 1223 back to their initial positions.

It should be understood that although the two clamping arm assemblies shown in the figures are used as an example for description in the foregoing embodiments, the number of the clamping arm assemblies is not a necessary condition for restraining the clamped part. For example, under certain circumstances, it is also possible to use only one clamping arm assembly which is hinged to one end of the opening and which directly forms a gap with the other end of the opening that cannot be passed through by the clamped part. When subjected to an external force that meets the condition, the clamping arm assembly can also rotate about the other end of the opening to form a path that can be passed through by the clamped part.

Furthermore, in order to facilitate the entry and exit of the clamped part into and out of the limiting space, and to avoid other undesired mechanical interference or wear, the rotatable ends of the clamp arm assemblies 121, 122 may also be configured to have guiding arc surfaces 12112*a*, 12212*a*, and the guiding arc surfaces 12112*a*, 12212*a* are configured to follow the direction in which the clamped part enters and exits the limiting space 111 via the opening 112, so as to guide the clamped part into and out of the limiting space along the desired direction of movement.

For another example, in order to facilitate the installation and positioning of the clamping device, a fixing portion 113 may also be arranged on the base 110, and the fixing portion 113 allows the base 110 to be fixed to an installation position, so as to realize quick disassembly and assembly.

In addition, although not shown in the figures, an embodiment of an elevator system is also provided herein. The elevator system includes the clamping device 100 in any of the foregoing embodiments or combinations thereof, so it also has various effects brought about by it, which will not be repeated herein. The following will focus on the arrangement position of the clamping device 100 in the elevator system, its relationships with other components, and the additional technical effects brought about when it is applied to the elevator system.

Specifically, the elevator system further includes an elevator car configured to move up and down vertically along a plurality of car guide rails in the elevator hoistway. Guide assemblies (not shown) installed to the top and bottom of the elevator car are configured to engage the car guide rails so as to maintain proper alignment of the elevator car when the elevator car moves in the elevator hoistway.

The elevator system further includes a counterweight device configured to move up and down vertically in the elevator hoistway. As is known in conventional elevator systems, the counterweight device moves in a direction substantially opposite to the movement of the elevator car. The movement of the counterweight device is guided by counterweight device guide rails installed in the elevator hoistway. In the non-limiting embodiment as shown, at least one load-bearing member (such as a belt or rope) is coupled to the elevator car and the counterweight device, and cooperates with a driving sheave installed to a driving machine. Therefore, the elevator car and the counterweight device move up and down along the elevator hoistway.

In addition, the elevator system also includes a traveling cable 200 positioned in the elevator hoistway, and the traveling cable 200 can connect the elevator car to an elevator control system through a car operation panel in the elevator car. In addition, the traveling cable 200 may be utilized to provide electricity and/or communication to the elevator car. In some embodiments, the traveling cable 200 is attached to the elevator car and/or enters the elevator car at the car floor of the elevator car, and can move along the elevator hoistway together with the elevator car.

Furthermore, with regard to the clamping devices 100 in any of the foregoing embodiments or combinations thereof, they can be respectively arranged in the elevator hoistway along the moving direction of the elevator car, and the clamping devices 100 can be aligned with the traveling cable 200 respectively.

Under this arrangement, in the downward movement process of the elevator car, when the swinging force of the traveling cable 200 is not less than the first damping force, the traveling cable 200 can swing to push away the clamping device 100 from the outside to the inside, and enter the limiting space 111 via the opening 112 so as to be restrained therein, thereby achieving reliable clamping of the traveling cable 200 at a lower cost, and avoiding collision and wear caused by excessive swinging. In the upward movement process of the elevator car, when a resultant force of a traction force of the elevator car and the swinging force of the traveling cable 200 is not less than the second damping force, the traveling cable 200 can be pulled by the elevator car to push away the clamping device 100 from the inside to the outside, and exit the limiting space 111 via the opening 112. The elevator system can thus reliably alleviate the undesired swinging of the traveling cable 200, increase its service life, and avoid the potential safety hazards caused thereby.

The following description will continue to introduce the structures and connection relationships of other modifications made to the elevator system to which the clamping device is applied. In addition, in consideration of further improvement of the reliability, practicability, economy or other aspects, some additional parts may be added, which are also exemplified as follows.

For example, considering that the elevator car of an elevator system usually has a long traveling distance, the traveling cable equipped therewith is also usually long. For such a long traveling distance, a single-point restraint strength and reliability of the clamping device are relatively insufficient. At this time, it may be considered to install a plurality of clamping devices 100 in the elevator hoistway at an interval of 6-8 meters to realize multi-point restraining on the traveling cable. It should be known that the greater the swinging strength experienced by the traveling cable of the elevator system is, the closer the interval should be set accordingly. It should also be known that the swing strength of the traveling cable is positively related to its own total length and the running speed of the elevator car.

As another example, considering that the required maximum movement distance of the traveling cable 200 is only half of the traveling distance of the elevator car (or the depth of the elevator hoistway), in order to improve the swinging problem, it can be considered to directly fix the upper half of the traveling cable 200 that does not need to move in the elevator hoistway, so that only the lower half has a swinging problem and a clamping device is required to be provided. In addition, the fixing of the upper half also reduces the length of the movable lower half of the traveling cable 200, thereby reducing its swinging strength.

As further another example, the traveling cable 200 used in an elevator system is generally configured to have a flat structure having a cross section with a thickness smaller than a width. It has been found through practice that this type of traveling cable 200 basically swings along its thickness direction with a relatively small size. Therefore, the clamping device 100 installed in the hoistway can be arranged in the thickness direction of the traveling cable 200 and aligned with the traveling cable 200, thereby having a better clamping and limiting effect on the traveling cable 200.

In addition, it should also be known that the clamping device provided by the present application and other parts of the elevator system can be designed, manufactured, and sold separately, or they can also be assembled together and then sold as a whole. Either the single pieces formed before the combination or the entirety formed after the combination will fall within the scope of protection of the present application.

In the above examples, the clamping device and the elevator system of the present application are mainly described. Although only some of the embodiments of the present application have been described, those skilled in the art should understand that the present application may be implemented in many other forms without departing from the spirit and scope thereof. Therefore, the illustrated examples and embodiments should be regarded as illustrative rather than restrictive, and the present application may cover various modifications and replacements without departing from the spirit and scope of the present application as defined by the appended claims.

What is claimed is:

1. A clamping device, comprising:

a base having a limiting space and an opening communicating with the limiting space; and a clamping arm assembly, which is arranged at the opening of the base and forms a gap with the opening in a stationary state, the gap being smaller than a size of a clamped part;

wherein the clamp arm assembly has a first damping force that allows the clamped part to enter the limiting space via the opening, and has a second damping force that allows the clamped part to exit the limiting space via the opening; and the second damping force is greater than the first damping force;

wherein the clamping arm assembly is hinged to the base, and the clamping arm assembly is capable of rotating toward the limiting space under a driving force no less than the first damping force, and are capable of rotating away from the limiting space under a driving force no less than the second damping force;

wherein the clamping arm assembly comprises:

a first-stage force arm and a first-stage damping member, wherein the first-stage damping member applies a damping force to the first-stage force arm when the first-stage force arm rotates either toward or away from the limiting space; and a second-stage force arm and a second-stage damping member, wherein the second-stage force arm is associated with the first-stage force arm, and moves in association with the first-stage force arm when the first-stage force arm rotates away from the limiting space; and when the second-stage force arm moves in association, the second-stage damping member applies a damping force to the second-stage force arm;

wherein the damping force applied by the first-stage damping member is not greater than the first damping force, and a damping force applied by the first-stage damping member and the second-stage damping member in association is not greater than the second damping force.

2. The clamping device according to claim 1, wherein:

the first-stage force arm comprises a first section and a second section; a first end of the first section and a first end of the second section are connected to each other and form an included angle, a first hinge point of the first-stage force arm and the base is arranged at a connection position of the first section and the second section; and the first-stage damping member is arranged at the first hinge point and abuts between a portion of the base that is close to the opening and the first section.

3. The clamping device according to claim 2, wherein a first end of the second-stage force arm abuts a side of the second section that is close to the first section and moves in association with the second section, and a second hinge point of the second-stage force arm and the base is arranged at a second end of the second-stage force arm; and the second-stage damping member is arranged at the second hinge point and abuts between a portion of the base that is away from the opening and the second-stage force arm.

4. The clamping device according to claim 3, wherein:

the first-stage damping member is configured as a first torsion spring arranged around the first hinge point, and the first section further comprises a first stop wall for abutting the first torsion spring; and/or the second-stage damping member is configured as a second torsion spring arranged around the second hinge point, and the second-stage force arm further comprises a second stop wall for abutting the second torsion spring.

5. The clamping device according to claim 1, comprising two said clamping arm assemblies arranged oppositely, wherein one of the clamping arm assemblies is hinged to the base at a first end of the opening, and the other one of the clamping arm assemblies is hinged to the base at a second end of the opening.

6. The clamping device according to claim 5, wherein in a stationary state, the two clamping arm assemblies are aligned with each other.

7. The clamping device according to claim 1, wherein the rotatable end of the clamping arm assembly has a guiding arc surface, and the guiding arc surface is configured to follow the direction in which the clamped part enters and exits the limiting space via the opening.

8. The clamping device according to claim 1, wherein the base further comprises a fixing portion that allows the base to be fixed to an installation position.

9. The clamping device according to claim 1, wherein the clamping device is configured to clamp or release a traveling cable of an elevator system.

10. An elevator system, comprising:

an elevator car, which can move along an elevator hoistway;

a traveling cable, which is operably connected to the elevator car and can move along the elevator hoistway together with the elevator car; and a plurality of the clamping devices according to claim 1, which are respectively arranged in the elevator hoistway in a moving direction of the elevator car and are aligned with the traveling cable respectively;

wherein in a downward movement process of the elevator car, if a swinging force of the traveling cable is not less than the first damping force, the traveling cable swings to enter the limiting space via the opening of the clamping device; and in an upward movement process of the elevator car, if a resultant force of a traction force of the elevator car and the swinging force of the traveling cable is not less than the second damping force, the traveling cable is pulled by the elevator car to exit the limiting space via the opening of the clamping device.

11. The elevator system according to claim 10, wherein the plurality of clamping devices are installed in the elevator hoistway at an interval of 6-8 meters.

12. The elevator system according to claim 10, wherein an upper portion of the traveling cable is fixed in the elevator hoistway.

13. The elevator system according to claim 10, wherein the traveling cable is configured to have a cross-section with a thickness smaller than a width; the traveling cable swings substantially in the thickness direction, and the clamping device is arranged to align with the traveling cable in the thickness direction.

* * * * *